(12) United States Patent
Zhao et al.

(10) Patent No.: US 12,485,415 B2
(45) Date of Patent: Dec. 2, 2025

(54) DETECTION CHIP, METHOD FOR MANUFACTURING DETECTION CHIP, METHOD FOR OPERATING DETECTION CHIP, AND REACTION SYSTEM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Zijian Zhao, Beijing (CN); Shinying Lau, Beijing (CN); Ruijun Deng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 1153 days.

(21) Appl. No.: 16/968,245

(22) PCT Filed: Nov. 13, 2019

(86) PCT No.: PCT/CN2019/118063
§ 371 (c)(1),
(2) Date: Aug. 7, 2020

(87) PCT Pub. No.: WO2021/092798
PCT Pub. Date: May 20, 2021

(65) Prior Publication Data
US 2022/0395828 A1 Dec. 15, 2022

(51) Int. Cl.
*B01L 3/00* (2006.01)
*B01L 7/00* (2006.01)
*B32B 17/06* (2006.01)

(52) U.S. Cl.
CPC ........... *B01L 3/502715* (2013.01); *B01L 7/52* (2013.01); *B32B 17/06* (2013.01);
(Continued)

(58) Field of Classification Search
CPC ............... B01L 3/502715; B01L 7/52; B01L 2300/0645; B01L 2300/161;
(Continued)

(56) References Cited

U.S. PATENT DOCUMENTS 4,770,963 A * 9/1988 Pai ..................... G03G 5/08235
430/85
2002/0164778 A1* 11/2002 Kajiyama ............ C12Q 1/6837
435/287.2
(Continued)

FOREIGN PATENT DOCUMENTS

CN 1715930 A 1/2006
CN 104593256 * 5/2015
(Continued)

OTHER PUBLICATIONS

First Chinese Office Action from Chinese Patent Application No. 201980002431.2 dated Mar. 30, 2022.
(Continued)

*Primary Examiner* — Jill A Warden
*Assistant Examiner* — Jacqueline Brazin
(74) *Attorney, Agent, or Firm* — Dilworth & Barrese LLP.; Michael J. Musella, Esq.

(57) ABSTRACT

A detection chip, a method for manufacturing a detection chip, a method for operating a detection chip, and a reaction system are disclosed. The detection chip includes a first substrate, a micro-cavity definition layer, and a heating electrode. The micro-cavity definition layer defines a plurality of micro-reaction chambers. The heating electrode is configured to release heat after being energized. The heating electrode includes a first electrode portion and at least one second electrode portion. Orthographic projections of the plurality of micro-reaction chambers on the first substrate are within an orthographic projection of the first electrode
(Continued)

portion on the first substrate, the orthographic projections of the plurality of micro-reaction chambers on the first substrate do not overlap with an orthographic projection of the second electrode portion on the first substrate, and a resistance value of the first electrode portion is greater than a resistance value of the second electrode portion.

19 Claims, 7 Drawing Sheets

(52) U.S. Cl.
CPC . *B01L 2300/0645* (2013.01); *B01L 2300/161* (2013.01); *B01L 2300/1827* (2013.01); *B01L 2300/1894* (2013.01); *B32B 2255/00* (2013.01); *B32B 2255/20* (2013.01); *B32B 2255/28* (2013.01); *B32B 2457/00* (2013.01)

(58) Field of Classification Search
CPC ..... B01L 2300/1827; B01L 2300/1894; B01L 3/502707; B01L 3/5088; B01L 3/50851; B01L 2200/0673; B01L 2200/147; B01L 2300/0819; B01L 2300/0887; B01L 2300/0893; B01L 2300/165; B32B 17/06; B32B 2255/00; B32B 2255/20; B32B 2255/28; B32B 2457/00
USPC ..................................................... 422/82.01
See application file for complete search history.

(56) References Cited

U.S. PATENT DOCUMENTS

| | | |
|---|---|---|
| 2003/0194709 A1 | 10/2003 | Yang et al. |
| 2006/0000709 A1 | 1/2006 | Bohm et al. |
| 2011/0084218 A1* | 4/2011 | Duhr .................... G01N 21/171 250/459.1 |
| 2011/0136109 A1* | 6/2011 | Drechsler ............. B01L 3/5085 435/6.1 |
| 2011/0217697 A1* | 9/2011 | Rothberg ........... G01N 27/4148 435/6.1 |
| 2018/0001286 A1 | 1/2018 | Wu |
| 2019/0203289 A1 | 7/2019 | Pang et al. |
| 2019/0204225 A1* | 7/2019 | Zhong ................ G01N 21/6428 |
| 2022/0032291 A1 | 2/2022 | Wu |

FOREIGN PATENT DOCUMENTS

| | | | | |
|---|---|---|---|---|
| CN | 104593256 | A | | 5/2015 |
| CN | 107402199 | A | | 11/2017 |
| CN | 108660068 | A | * 10/2018 | .......... C12Q 1/6851 |
| CN | 109772484 | A | | 5/2019 |
| CN | 109876875 | A | | 6/2019 |
| CN | 109894167 | A | | 6/2019 |
| CN | 110066723 | A | | 7/2019 |
| EP | 2332654 | A1 | | 6/2011 |
| IN | 108816300 | A | | 11/2018 |
| WO | WO-2007120241 | A2 | * 10/2007 | .......... B01F 11/0071 |
| WO | WO-2011002957 | A2 | * 1/2011 | ........ B01L 3/502707 |
| WO | 2017/127570 | A1 | | 7/2017 |

OTHER PUBLICATIONS

Search Report from European Patent Application No. 19945399.4 dated Nov. 2, 2022.

* cited by examiner

DETECTION CHIP, METHOD FOR MANUFACTURING DETECTION CHIP, METHOD FOR OPERATING DETECTION CHIP, AND REACTION SYSTEM

TECHNICAL FIELD

Embodiments of the present disclosure relate to a detection chip, a method for manufacturing a detection chip, a method for operating a detection chip, and a reaction system.

BACKGROUND

The polymerase chain reaction (PCR) is a molecular biology technology used for amplifying specific DNA fragments, and the PCR can copy a large amount of deoxyribonucleic acid (DNA) and greatly increase the amount of DNA. Different from traditional PCR technology, digital polymerase chain reaction (dPCR) chip technology can implement the absolute quantitative detection of single molecule DNA by sufficiently diluting the nucleic acid sample to allow the amount of target molecules (i.e., DNA templates) in each reaction unit to be less than or equal to one, performing PCR amplification on the target molecule in each reaction unit, respectively, and then statistically analyzing the fluorescent signal of each reaction unit after the amplification. Because the dPCR has advantages of high sensitivity, strong specificity, high detection throughput, accurate quantification, etc., the dPCR is widely used in the fields of clinical diagnosis, gene instability analysis, single-cell gene expression, environmental microorganism detection, prenatal diagnosis, etc.

SUMMARY

At least one embodiment of the present disclosure provides a detection chip, and the detection chip comprises: a first substrate; a micro-cavity definition layer on the first substrate and defining a plurality of micro-reaction chambers; and a heating electrode on the first substrate and closer to the first substrate than the micro-cavity definition layer, configured to release heat after being energized. The heating electrode comprises a first electrode portion and at least one second electrode portion electrically connected to the first electrode portion, orthographic projections of the plurality of micro-reaction chambers on the first substrate are within an orthographic projection of the first electrode portion on the first substrate, the orthographic projections of the plurality of micro-reaction chambers on the first substrate do not overlap with an orthographic projection of the second electrode portion on the first substrate, and a resistance value of the first electrode portion is greater than a resistance value of the second electrode portion.

For example, in the detection chip provided by an embodiment of the present disclosure, a thickness of the first electrode portion in a direction perpendicular to the first substrate is smaller than a thickness of the second electrode portion in the direction perpendicular to the first substrate.

For example, in the detection chip provided by an embodiment of the present disclosure, a material of the first electrode portion and a material of the second electrode portion are a transparent conductive material.

For example, the detection chip provided by an embodiment of the present disclosure further comprises a hydrophilic layer, and the hydrophilic layer covers a sidewall and a bottom of each of the plurality of micro-reaction chambers.

For example, in the detection chip provided by an embodiment of the present disclosure, a material of the hydrophilic layer is silicon oxide that is subjected to a surface alkali treatment or silicon oxynitride that is subjected to a surface alkali treatment.

For example, the detection chip provided by an embodiment of the present disclosure further comprises a hydrophobic layer, and the hydrophobic layer covers a spacing region between the plurality of micro-reaction chambers in the micro-cavity definition layer.

For example, in the detection chip provided by an embodiment of the present disclosure, a material of the hydrophobic layer is silicon nitride that is subjected to a plasma modification treatment.

For example, the detection chip provided by an embodiment of the present disclosure further comprises a control circuit layer and a first insulating layer which are sequentially stacked. The control circuit layer comprises a control circuit, the first insulating layer comprises a via hole, the control circuit is electrically connected to the heating electrode through the via hole, and the control circuit is configured to apply an electrical signal to the heating electrode to energize the heating electrode.

For example, in the detection chip provided by an embodiment of the present disclosure, the control circuit layer further comprises a connection electrode, and the connection electrode is not covered by the first insulating layer and is exposed to atmosphere.

For example, in the detection chip provided by an embodiment of the present disclosure, the detection chip comprises a reaction region, a peripheral region, and a cooling region. The plurality of micro-reaction chambers are in the reaction region, the connection electrode is in the peripheral area, the first electrode portion is in the reaction region, and the second electrode portion is in the cooling region.

For example, the detection chip provided by an embodiment of the present disclosure further comprises a second insulating layer, and the second insulating layer is between the heating electrode and the micro-cavity definition layer.

For example, the detection chip provided by an embodiment of the present disclosure further comprises a second substrate, the second substrate is opposite to the first substrate, and a gap is between the second substrate and the first substrate so as to form a space for containing liquid.

For example, in the detection chip provided by an embodiment of the present disclosure, the first substrate and the second substrate comprise glass substrates.

For example, in the detection chip provided by an embodiment of the present disclosure, a material of the micro-cavity definition layer is photoresist.

At least one embodiment of the present disclosure further provides a reaction system, which comprises a control device and the detection chip described above. The control device is electrically connected to the detection chip, and is configured to apply an electrical signal to the detection chip.

At least one embodiment of the present disclosure further provides a method for manufacturing the detection chip described above. The method comprises: forming the heating electrode on the first substrate; and forming the micro-cavity definition layer on the heating electrode.

For example, in the method provided by an embodiment of the present disclosure, in the case where the detection chip further comprises a hydrophilic layer, the method further comprises: forming a silicon oxide layer or a silicon oxynitride layer on the micro-cavity definition layer; and immersing a portion, covering a sidewall and a bottom of each of the plurality of micro-reaction chambers, of the silicon oxide layer or the silicon oxynitride layer with an alkaline solution to perform surface modification, so as to form the hydrophilic layer.

For example, in the method provided by an embodiment of the present disclosure, the alkaline solution is a potassium hydroxide solution.

For example, in the method provided by an embodiment of the present disclosure, a mass fraction of the potassium hydroxide solution is 0.4%.

At least one embodiment of the present disclosure further provides a method for operating the detection chip described above. The method comprises: allowing a reaction system solution to enter the plurality of micro-reaction chambers; and energizing the heating electrode to allow the heating electrode to release heat.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
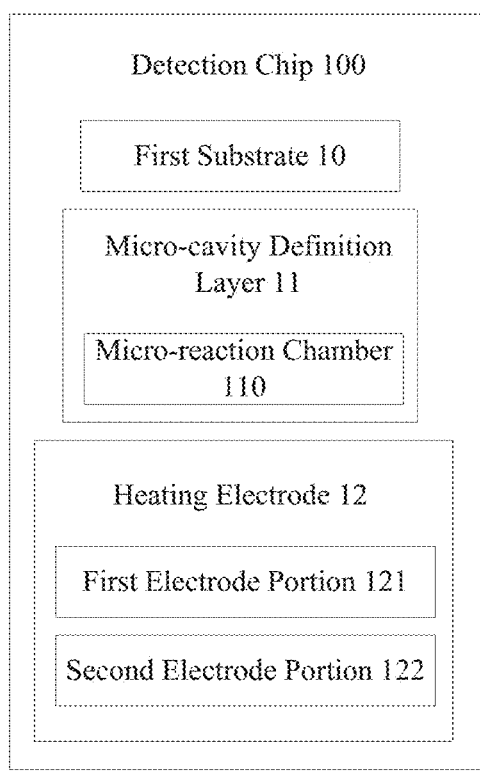
FIG. 1 is a schematic block diagram of a detection chip provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

During the PCR reaction, the double-stranded structure of the DNA fragment is subjected to the denaturation to form the single-stranded structure at a high temperature, primers and single strands are combined according to the principle of complementary base pairing at a low temperature, and base combining extension is implemented at the optimal temperature of the DNA polymerase. The above process is the temperature cycling process of denaturation-annealing-extending. The DNA fragment can implement mass replication through a plurality of temperature cycling processes of denaturation-annealing-extending.

In order to implement the above temperature cycling process, a series of external equipments may be used to heat the detection chip, so that the volume of the device is large, the operation is complicated, and the cost is high. Generally, most dPCR products are processed on silicon, which is difficult for large-scale industrial production, so that the cost of the detection chip is high, and the process is complicated.

At least one embodiment of the present disclosure provides a detection chip, a method for manufacturing a detection chip, a method for operating a detection chip, and a reaction system. The detection chip has good effect of temperature control and high efficiency of temperature rising and lowering, which may improve the accuracy of the detection result. The detection chip is simple to manufacture, compatible with the semiconductor production line, and low in production cost, which may facilitate achieving large-scale standardized production.

Hereinafter, the embodiments of the present disclosure are described in detail with reference to the accompanying drawings. It should be noted that the same reference numerals in different drawings are used to refer to the same described elements.

At least one embodiment of the present disclosure provides a detection chip, and the detection chip includes a first substrate, a micro-cavity definition layer, and a heating electrode. The micro-cavity definition layer is on the first substrate and defines a plurality of micro-reaction chambers. The heating electrode is on the first substrate and closer to the first substrate than the micro-cavity definition layer, and is configured to release heat after being energized. The heating electrode includes a first electrode portion and at least one second electrode portion electrically connected to the first electrode portion. Orthographic projections of the plurality of micro-reaction chambers on the first substrate are within an orthographic projection of the first electrode portion on the first substrate, the orthographic projections of the plurality of micro-reaction chambers on the first substrate do not overlap with an orthographic projection of the second electrode portion on the first substrate, and a resistance value of the first electrode portion is greater than a resistance value of the second electrode portion.

FIG. 1 is a schematic block diagram of a detection chip provided by some embodiments of the present disclosure. For example, as illustrated in FIG. 1, a detection chip 100 includes a first substrate 10, a micro-cavity definition layer 11, and a heating electrode 12. The first substrate 10 provides functions such as protection, support, etc., and for example, may be a glass substrate. The micro-cavity definition layer 11 is located on the first substrate 10 and defines a plurality of micro-reaction chambers 110. The heating electrode 12 is located on the first substrate 10 and is closer to the first substrate 10 than the micro-cavity definition layer 11, and the heating electrode 12 is configured to release heat after being energized.

For example, the heating electrode 12 includes a first electrode portion 121 and at least one second electrode portion 122 electrically connected to the first electrode portion 121. Orthographic projections of the plurality of micro-reaction chambers 110 on the first substrate 10 are within an orthographic projection of the first electrode portion 121 on the first substrate 10, and the orthographic projections of the plurality of micro-reaction chambers 110 on the first substrate 10 do not overlap with an orthographic projection of the second electrode portion 122 on the first substrate 10. A resistance value of the first electrode portion 121 is greater than a resistance value of the second electrode portion 122.

For example, the detection chip 100 can be used to perform the polymerase chain reaction (e.g., the digital polymerase chain reaction), and can be further used in the detection process after the reaction. For example, the micro-reaction chamber 110 is used to contain the reaction system solution, and the heating electrode 12 releases heat after being energized, thereby heating the reaction system solution in the micro-reaction chamber 110 to perform the amplification reaction.

Figure 2:
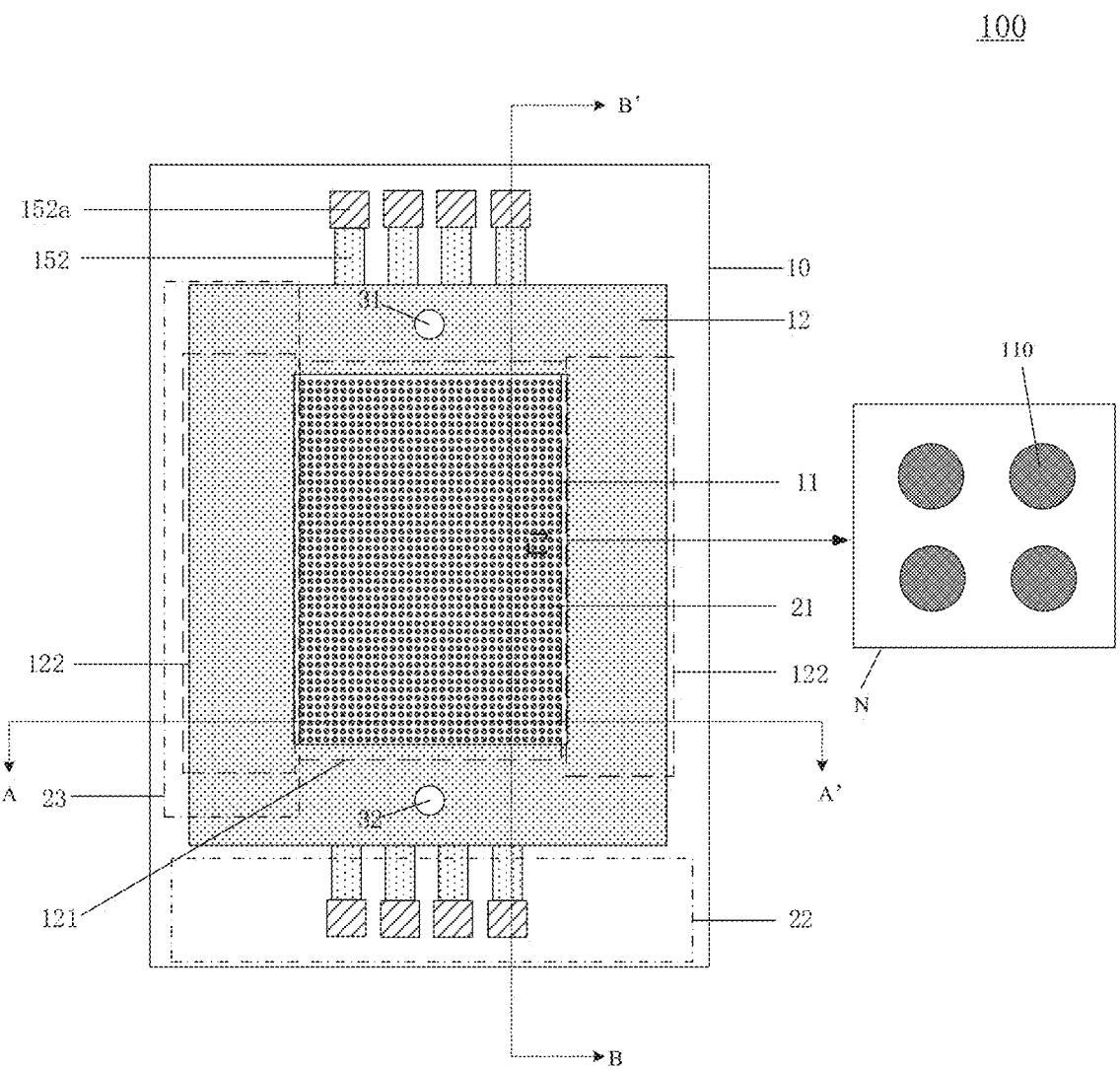
FIG. 2 is a schematic planar diagram of a detection chip provided by some embodiments of the present disclosure.
Figure 3A:
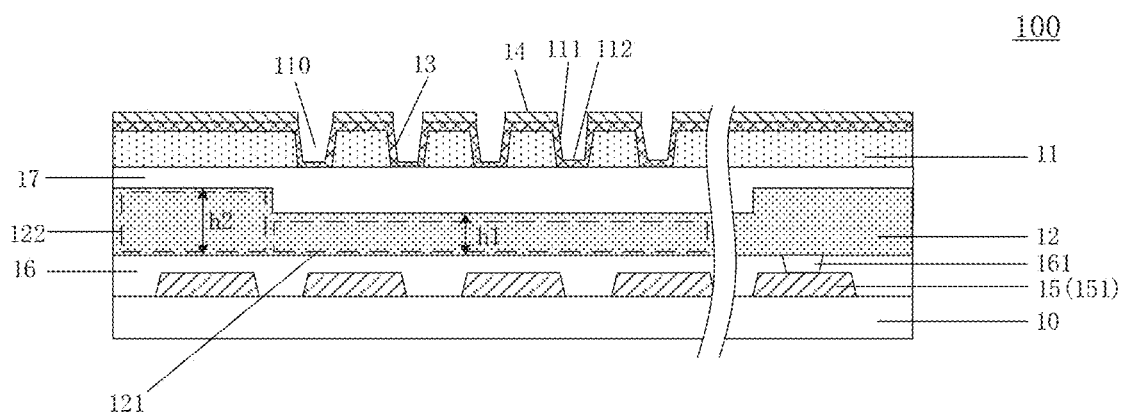
FIG. 3A is a schematic cross-sectional diagram of the detection chip illustrated in FIG. 2 along A-A'.
Figure 3B:
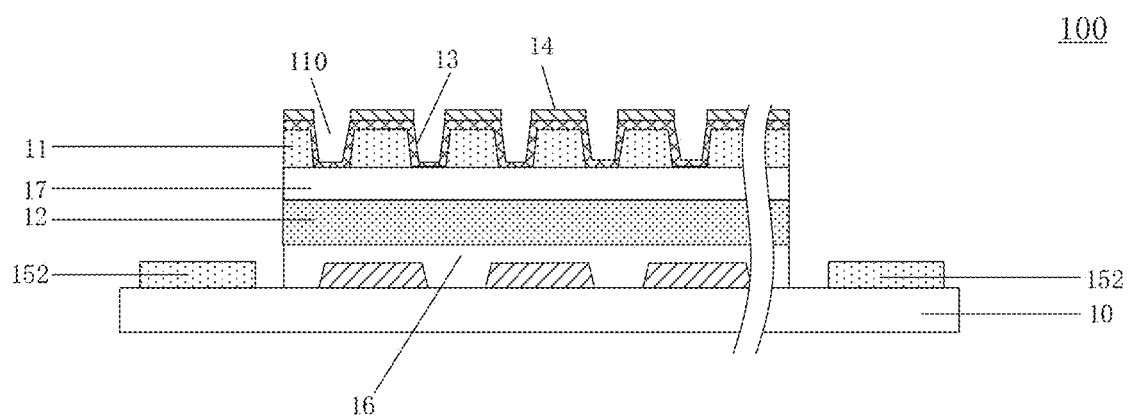
FIG. 3B is a schematic cross-sectional diagram of the detection chip illustrated in FIG. 2 along B-B'.

FIG. 2 is a schematic planar diagram of a detection chip provided by some embodiments of the present disclosure, FIG. 3A is a schematic cross-sectional diagram of the detection chip illustrated in FIG. 2 along A-A', and FIG. 3B is a schematic cross-sectional diagram of the detection chip illustrated in FIG. 2 along B-B'.

For example, as illustrated in FIG. 2, FIG. 3A, and FIG. 3B, the micro-cavity definition layer 11 is located on the first substrate 10 and defines a plurality of micro-reaction chambers 110. Adjacent micro-reaction chambers 110 are at least partially spaced apart from each other (for example, by a partition wall). For example, each of the plurality of micro-reaction chambers 110 includes a sidewall 111 and a bottom 112. The micro-reaction chamber 110 provides an accommodation space for the reaction system solution, and the droplets of the reaction system solution which enter the micro-cavity definition layer 11 and move to the micro-reaction chamber 110 are relatively stable in the micro-reaction chamber 110 and maintain staying in the micro-reaction chamber 110. For example, the micro-reaction chamber 110 may be a micro-reaction groove, a micro-reaction depression, etc., as long as the micro-reaction chamber 110 has a space capable of containing the reaction system solution, and the embodiments of the present disclosure are not limited in this aspect.

For example, the shapes of the plurality of micro-reaction chambers 110 may be the same, and the three-dimensional shape of each micro-reaction chamber 110 is, for example, an approximate circular truncated cone, that is, as illustrated in the partially enlarged view N in FIG. 3A, FIG. 3B, and FIG. 2, the cross section in the direction perpendicular to the first substrate 10 is approximately trapezoidal, and the cross section in the plane parallel to the first substrate 10 is approximately circular. It should be noted that at least some of the micro-reaction chambers 110 may have different shapes.

It should be noted that, in the embodiments of the present disclosure, the shape of the micro-reaction chamber 110 is not limited, and can be designed according to actual needs. For example, the shape of each micro-reaction chamber 110 may also be any suitable shape such as a cylinder, a cuboid, a polygonal prism, a sphere, an ellipsoid, etc. For example, the cross-sectional shape of the micro-reaction chamber 110 in the plane parallel to the first substrate 10 may be an ellipse, a triangle, a polygon, an irregular shape, or the like, and the cross-sectional shape in the direction perpendicular to the first substrate 10 may be a square, a circle, a parallelogram, a rectangle, etc.

For example, as illustrated in FIG. 2, the plurality of micro-reaction chambers 110 are uniformly distributed on the first substrate 10. For example, on the first substrate 10, the plurality of micro-reaction chambers 110 are arranged in an array. In this way, the fluorescent image obtained during the optical detection performed on the detection chip 100 in the subsequent phase can be more regular and orderly, so as to obtain the detection result quickly and accurately. Certainly, the embodiments of the present disclosure are not limited thereto, the plurality of micro-reaction chambers 110 may be unevenly distributed on the first substrate 10 or may be in other arrangements, and the embodiments of the present disclosure do not limit this.

It should be noted that in the embodiments of the present disclosure, the size and number of the micro-reaction chambers 110 may be determined according to actual needs, and the size and number of the micro-reaction chambers 110 are related to the size of the detection chip 100 and the size of the first substrate 10. In the case where the size of the micro-reaction chamber 110 is unchanged, the larger the number of the micro-reaction chambers 110, the larger the size of the detection chip 100 and the size of the first substrate 10 accordingly. For example, in some examples, the size (the diameter) of the micro-reaction chamber 110 is 25 microns. For example, in the current manufacturing process, the number of the micro-reaction chambers 110 can reach hundreds of thousands or even millions in an area of tens of square centimeters, and the detection throughput of the detection chip 100 is large.

For example, the material of the micro-cavity definition layer 11 is photoresist, and for example, may be thick-film processable photoresist, such as PS resist. The photoresist may be formed on the first substrate 10 by spin coating and has a large thickness. For example, the thickness of the micro-cavity definition layer 11 may range from 5 microns to 100 microns, for example, 9.8 microns. For example, the micro-cavity definition layer 11 may be patterned and etched to obtain the plurality of micro-reaction chambers 110, and the plurality of micro-reaction chambers 110 are disposed spacing from each other.

For example, as illustrated in FIG. 2, FIG. 3A, and FIG. 3B, the heating electrode 12 is located on the first substrate 10, and the heating electrode 12 is closer to the first substrate 10 than the micro-cavity definition layer 11. The heating electrode 12 is configured to release heat after being energized. For example, the heating electrode 12 can receive an electrical signal (such as a voltage signal or a current signal), so that heat is generated when the current flows through the heating electrode 12, and the heat is conducted to at least some of the micro-reaction chambers 110 for the polymerase chain reaction. For example, the heating electrode 12 may be made of a conductive material with a large resistivity, so that the heating electrode 12 may generate a large amount of heat under a small electrical signal, so as to improve the energy conversion rate. The heating electrode 12 may be made of, for example, a transparent conductive material, such as indium tin oxide (ITO), tin oxide, or the like, so as to facilitate subsequent optical detection. Certainly, the embodiments of the present disclosure are not limited to this case, the heating electrode 12 may also be made of other suitable materials, such as metal or the like, and the embodiments of the present disclosure are not limited in this aspect.

For example, the heating electrode 12 is a planar electrode, and for example, the conductive material is continuously formed on the first substrate 10 to form the heating electrode 12, so that the plurality of micro-reaction chambers 110 can receive the heat released by the heating electrode 12. Certainly, the embodiments of the present disclosure are not limited thereto, and the heating electrode 12 may also have a specific shape or pattern, such as a polygonal shape, a broken line shape, a circular arc shape, etc., which may be determined according to the distribution manner of the plurality of micro-reaction chambers 110. The size of the heating electrode 12 is not limited, which can be determined according to actual needs. For example, in some examples, the heating electrode 12 is rectangular, one side of the heating electrode 12 is 37500 microns in length, and the other side of the heating electrode 12 is 57600 microns in length.

For example, the heating electrode 12 includes a first electrode portion 121 and at least one second electrode portion 122 electrically connected to the first electrode portion 121. For example, in some examples, as illustrated in FIG. 2, FIG. 3A, and FIG. 3B, the heating electrode 12 includes one first electrode portion 121 and two second electrode portions 122, and the two second electrode portions 122 are located on different sides of the first electrode portion 121. The first electrode portion 121 is electrically connected to the second electrode portions 122, for example, by direct contact.

Orthographic projections of the plurality of micro-reaction chambers 110 on the first substrate 10 are within an orthographic projection of the first electrode portion 121 on the first substrate 10, and the orthographic projections of the plurality of micro-reaction chambers 110 on the first substrate 10 do not overlap with an orthographic projection of the second electrode portion 122 on the first substrate 10. Here, the "orthographic projection" refers to a projection on the first substrate 10 in the direction perpendicular to the first substrate 10. In this way, the heating electrode 12 can heat each micro-reaction chamber 110. Moreover, compared with the second electrode portion 122, the heat released by the first electrode portion 121 is transmitted to the plurality of micro-reaction chambers 110 more quickly and directly.

For example, the resistance value of the first electrode portion 121 is greater than the resistance value of the second electrode portion 122. When an electrical signal is applied to the heating electrode 12, the first electrode portion 121 and the second electrode portion 122 are in series connection to divide the voltage. For example, the resistance value of the first electrode portion 121 is greater than the resistance value of any one of the second electrode portions 122. Because the resistance value of the first electrode portion 121 is greater, the divided voltage of the first electrode portion 121 is greater, and the heating power is greater, thereby improving the efficiency of temperature rising and lowering of the first electrode portion 121. Because the efficiency of temperature rising and lowering of the first electrode portion 121 is high, the temperature control effect on the plurality of micro-reaction chambers 110 can be improved, thereby facilitating the effective amplification reaction of the reaction system solution in the micro-reaction chambers 110, and further improving the accuracy of the detection result.

In the embodiments of the present disclosure, by providing the heating electrode 12 in the detection chip 100, the micro-reaction chamber 110 of the detection chip 100 can be effectively heated, so that the temperature control of the micro-reaction chamber 110 can be implemented without external heating equipment, which is in high degree of integration. By providing the first electrode portion 121 and the second electrode portion 122 with different resistance values, the temperature control effect of the detection chip 100 can be improved, the efficiency of temperature rising and lowering is high, and the accuracy of the detection result can be improved. The detection chip 100 can more easily, more sensitively, and non-invasively detect nucleic acid molecules extracted from body fluids such as blood and urine, and can implement auxiliary diagnosis and treatment in the fields of single cell analysis, early diagnosis of cancer, prenatal diagnosis, etc.

For example, in some examples, as illustrated in FIG. 3A, the thickness h1 of the first electrode portion 121 in the direction perpendicular to the first substrate 10 is smaller than the thickness h2 of the second electrode portion 122 in the direction perpendicular to the first substrate 10. Because the thickness h1 of the first electrode portion 121 is smaller, according to the formula of the relationship between the resistance value and the resistivity, it can be known that by reasonably setting the width of the first electrode portion 121 and the width of the second electrode portion 122, the resistance value of the first electrode portion 121 can be greater. Therefore, when an electrical signal is applied to the heating electrode 12, the divided voltage of the first electrode portion 121 is greater, thereby having a higher efficiency of temperature rising and lowering, so that the temperature control effect of the plurality of micro-reaction chambers 110 is better. For example, in this example, the first electrode portion 121 and the second electrode portion 122 may be prepared by using the same material (for example, ITO). For example, the specific numerical relationship between the thickness h1 of the first electrode portion 121 and the thickness h2 of the second electrode portion 122 may be determined according to actual needs, for example, based on test results or theoretical calculation results, as long as h1<h2, and the embodiments of the present disclosure do not limit this.

For example, in this example, the first electrode portion 121 has a uniform thickness h1, the second electrode portion 122 has a uniform thickness h2, and the connection portion between the first electrode portion 121 and the second electrode portion 122 forms a step. Certainly, the embodiments of the present disclosure are not limited to this case, and in some other examples, the first electrode portion 121 and the second electrode portion 122 may also have gradually varied thicknesses, respectively, so that the connection portion between the first electrode portion 121 and the second electrode portion 122 is sloped.

It should be noted that the specific cross-sectional shapes and structural forms of the first electrode portion 121 and the second electrode portion 122 may be determined according to actual requirements, and the embodiments of the present disclosure do not limit this. For example, the first electrode portion 121 and the second electrode portion 122 may be formed in the same sputtering process or in different sputtering processes, and for example, by controlling the sputtering position and the sputtering amount, the first electrode portion 121 and the second electrode portion 122 may have the required thicknesses and cross-sectional shapes, respectively.

For example, in order to allow the resistance value of the first electrode portion 121 to be greater than the resistance value of the second electrode portion 122, the first electrode portion 121 and the second electrode portion 122 may also be prepared by using different materials. For example, in other examples, the material of the first electrode portion 121 is a first material, the material of the second electrode portion 122 is a second material, the first material is different from the second material, and the resistivity of the first material is greater than the resistivity of the second material, so that the resistance value of the first electrode portion 121 is greater than the resistance value of the second electrode portion 122. In this way, the thickness of the first electrode portion 121 may be the same as the thickness of the second electrode portion 122.

For example, the materials of the first electrode portion 121 and the second electrode portion 122 may be transparent conductive material, such as ITO, tin oxide, etc., so as to facilitate subsequent optical detection. The material of the first electrode portion 121 and the material of the second electrode portion 122 may be the same or different, which is not limited in the embodiments of the present disclosure.

For example, as illustrated in FIG. 3A and FIG. 3B, the detection chip 100 further includes a hydrophilic layer 13, and the hydrophilic layer 13 has the characteristics of hydrophilicity and lipophobicity. For example, the hydrophilic layer 13 covers the sidewall 111 and the bottom 112 of each of the plurality of micro-reaction chambers 110. Because the surface (i.e., the sidewall 111 and the bottom 112) of the micro-reaction chamber 110 is covered by the hydrophilic layer 13, the hydrophilicity of the micro-reaction chamber 110 is improved, and in the case where no driving force is applied to the reaction system solution from the outside, the reaction system solution can gradually enter each micro-reaction chamber 110 automatically based on the capillary phenomenon, so as to implement automatic injection and sample filling.

For example, the material of the hydrophilic layer 13 is silicon oxide that is subjected to a surface alkali treatment or silicon oxynitride that is subjected to a surface alkali treatment, and the silicon oxide is, for example, silicon dioxide ($SiO_2$) The surface alkali treatment refers to the operation of immersing a portion, covering the sidewall 111 and the bottom 112 of the micro-reaction chamber 110, of the silicon oxide or silicon oxynitride with an alkaline solution, so as to perform surface modification to form the hydrophilic layer 13. For example, the alkaline solution used for the surface alkali treatment is a potassium hydroxide (KOH) solution, and a mass fraction of the potassium hydroxide solution is about 0.4%. For example, the potassium hydroxide solution is used to immerse the portion, covering the sidewall 111 and the bottom 112 of the micro-reaction chamber 110, of the silicon oxide or silicon oxynitride, the immersion time is about 15 minutes, and then operations such as washing and drying are performed, so that the modification is achieved to form the hydrophilic layer 13. The operation method of the surface alkali treatment is simple, the reagent is low in cost and is easy to obtain, and no complicated external equipment is needed, thereby improving the processing efficiency.

It should be noted that, in the embodiments of the present disclosure, the alkaline solution used for the surface alkali treatment is not limited to the potassium hydroxide solution, other applicable alkaline solutions may also be used, and the concentration (e.g., the mass fraction) of the alkaline solution is not limited, which may be determined according to actual needs.

It should be noted that, in the embodiments of the present disclosure, the hydrophilic layer 13 may also be prepared by using other suitable inorganic materials or organic materials, and the surface modification method may also adopt other suitable modification methods, as long as the hydrophilic layer 13 has hydrophilicity. For example, the hydrophilic layer 13 can be directly prepared by using a hydrophilic material. For another example, the hydrophilic layer 13 may be made of a material without hydrophilicity. In this case, the hydrophilic treatment needs to be performed on the surface of the hydrophilic layer 13 away from the micro-cavity definition layer 11, so as to allow the surface of the hydrophilic layer 13 away from the micro-cavity definition layer 11 to have hydrophilicity. For example, in the case where a non-hydrophilic material, such as silicon nitride, is used, the hydrophilic treatment can be performed thereon, and for example, the gel modification method, the ultraviolet radiation method, the plasma method, or the like may be used to allow the surface of the non-hydrophilic material to have hydrophilic groups so as to have hydrophilicity.

For example, as illustrated in FIG. 3A and FIG. 3B, the detection chip 100 further includes a hydrophobic layer 14. The hydrophobic layer 14 has the characteristics of hydrophobicity and lipophilicity, and covers a spacing region between the plurality of micro-reaction chambers 110 in the micro-cavity definition layer 11. By providing the hydrophobic layer 14, the reaction system solution can more easily enter each micro-reaction chamber 110. For example, the material of the hydrophobic layer 14 is silicon nitride that is subjected to a plasma modification treatment. Certainly, the embodiments of the present disclosure are not limited thereto, and the hydrophobic layer 14 may also be made of resin or other suitable inorganic materials or organic materials, as long as the surface of the hydrophobic layer 14 away from the micro-cavity definition layer 11 is hydrophobic. For example, the hydrophobic layer 14 can be directly prepared by using a hydrophobic material. For another example, the hydrophobic layer 14 may be made of a material without hydrophobicity, and in this case, the hydrophobic treatment needs to be performed on the surface of the hydrophobic layer 14 away from the micro-cavity definition layer 11, so as to allow the hydrophobic layer 14 to have hydrophobicity.

In the embodiments of the present disclosure, the hydrophilic layer 13 and the hydrophobic layer 14 can cooperate to adjust the surface contact angle of the droplets of the reaction system solution, so that the detection chip 100 can implement self-aspirating liquid injection and oil sealing. For example, in the detection chip 100, the hydrophobic layer 14 is provided to improve the hydrophobic performance outside the micro-reaction chamber 110, so that the outside of the micro-reaction chamber 110 (for example, the spacing region between the plurality of micro-reaction chambers 110) is hydrophobic while the inner surface of the micro-reaction chamber 110 has good hydrophilicity, so as to allow the reaction system solution to infiltrate from the outside of the micro-reaction chamber 110 to the inside of the micro-reaction chamber 110. Therefore, under the cooperation of the hydrophilic layer 13 and the hydrophobic layer 14, the reaction system solution enters the micro-reaction chambers 110 more easily.

For example, in the example illustrated in FIG. 3A and FIG. 3B, the hydrophobic layer 14 is disposed on the hydrophilic layer 13, and the hydrophilic layer 13 covers the entire surface of the micro-cavity definition layer 11 away from the first substrate 10, which can simplify the manufacturing process of the hydrophilic layer 13, and for example, there is no need to perform the process such as patterning on the hydrophilic layer 13. Certainly, the embodiments of the present disclosure are not limited thereto, and the hydrophilic layer 13 and the hydrophobic layer 14 may be provided in other ways. For example, in some other examples, the hydrophilic layer 13 only covers the sidewall 111 and the bottom 112 of the micro-reaction chamber 110, and does not cover the spacing region between the plurality of micro-reaction chambers 110. In this case, the hydrophobic layer 14 is directly disposed on the surface of the micro-cavity definition layer 11 away from the first substrate 10, and the hydrophobic layer 14 is in direct contact with the micro-cavity definition layer 11 and is located in the spacing region between the plurality of micro-reaction chambers 110. In this way, the thickness of the detection chip 100 can be reduced, and the hydrophilic layer 13, exposed at the peeling portion after part of the hydrophobic layer 14 is peeled off, can be prevented from affecting the infiltration of the reaction system solution into the micro-reaction chamber 110.

For example, as illustrated in FIG. 3A and FIG. 3B, the detection chip 100 further includes a control circuit layer 15 and a first insulating layer 16 which are sequentially stacked.

The control circuit layer 15 is provided on the first substrate 10. The control circuit layer 15 includes a control circuit 151, and the control circuit 151 is configured to apply an electrical signal to the heating electrode 12 to energize the heating electrode 12. After receiving the electrical signal, the heating electrode 12 can generate heat under the action of the electrical signal, thereby heating the micro-reaction chambers 110. For example, the control circuit 151 may include any suitable circuit element and structure, such as a switching transistor, a wire, an amplification circuit, a processing circuit, etc., which are not limited in the embodiments of the present disclosure.

It should be noted that in FIG. 3A and FIG. 3B, the control circuit layer 15 (the control circuit 151) is represented as a plurality of separate portions (for example, the plurality of diagonal block regions illustrated in the figure). However, this is only to illustrated that the control circuit layer 15 may include a plurality of different circuit elements and structures, and does not represent the actual structure of the control circuit layer 15. For example, the control circuit layer 15 may actually be a multi-layer structure in which switching transistors, wires, resistors, capacitors, or other suitable circuit structures may be provided, which may be determined according to actual needs, and the embodiments of the present disclosure are not limited in this aspect. The control circuit layer 15 may be made of any suitable materials, such as metal, transparent conductive materials, semiconductor materials, insulating materials, etc., and these materials form a multi-layer structure through a plurality of processes, so as to form the control circuit layer 15 and the control circuit 151 thereof.

The first insulating layer 16 is provided on the first substrate 10 and covers the control circuit layer 15. The first insulating layer 16 includes a via hole 161 which penetrates the first insulating layer 16, and the control circuit 151 is electrically connected to the heating electrode 12 through the via hole 161. The shape of the via hole 161 may be a cylinder, a truncated cone, or the like. For example, the specific position of the via hole 161 is not limited, and may be determined according to actual needs, for example, according to the layout design of the control circuit 151. For example, the first insulating layer 16 provides the necessary insulation between the control circuit layer 15 and the heating electrode 12 and provides a flat surface to facilitate the placement of the heating electrode 12 on the first insulating layer 16. The first insulating layer 16 may be made of an inorganic insulating material or an organic insulating material. For example, the material of the first insulating layer 16 is silicon dioxide, silicon nitride, or the like.

For example, as illustrated in FIG. 2 and FIG. 3B, the control circuit layer 15 further includes a connection electrode 152, and the connection electrode 152 is not covered by the first insulating layer 16 and is exposed to the atmosphere. The connection electrode 152 is used to be electrically connected to an additionally provided device to receive an electrical signal and transmit the electrical signal to the control circuit 151. For example, in the case where the connection electrode 152 is made of a metal material, the connection electrode 152 may be electro-plated, thermally sprayed, or vacuum-plated to form a metal protection layer on the surface of the connection electrode 152, so as to prevent the connection electrode 152 from being oxidized and prevent the electrical conductivity of the connection electrode 152 from being affected.

For example, the connection electrode 152 may further include a contact portion 152a (as illustrated in FIG. 2, for example, a pad region), and the contact portion 152a is also not covered by the first insulating layer 16. For example, the contact portion 152a has a large square shape, so that the contact portion 152a can be easily connected to a probe or an electrode in an additionally provided device in a contact manner, and the contact portion 152a has a large contact area and can stably receive the electrical signal. In this way, the detection chip 100 can be plug and play, with simple operation, and convenient to use.

It should be noted that in the embodiments of the present disclosure, the amount of the connection electrodes 152 is not limited, and may be one or more, which may be determined according to actual needs, for example, according to the amount of signals to be received. For example, in the case where the control circuit 151 needs to receive a plurality of electrical signals, a plurality of connection electrodes 152 may be provided, and the number of the plurality of connection electrodes 152 is equal to the number of the plurality of electrical signals, thereby achieving signal transmission. For example, in the case where the control circuit 151 only needs to receive one electrical signal, one connection electrode 152 may be provided for signal transmission, or a plurality of connection electrodes 152 may be provided and these connection electrodes 152 are used to receive the same electrical signal so as to improve the reliability of transmission.

For example, as illustrated in FIG. 2, the detection chip 100 includes a reaction region 21, a peripheral region 22, and a cooling region 23. The plurality of micro-reaction chambers 110 are located in the reaction region 21. The connection electrode 152 is located in the peripheral region 22. The first electrode portion 121 is located in the reaction region 21, and the second electrode portion 122 is located in the cooling region 23. For example, in this example, the detection chip 100 includes two cooling regions 23, and the two cooling regions 23 are located on different sides (such as the left side and the right side illustrated in FIG. 2) of the reaction region 21 and correspond to positions of the two second electrode portions 122, respectively. Because the resistance value of the first electrode portion 121 is greater than the resistance value of the second electrode portion 122, the amount of heat generated in the cooling region 23 is small, thereby reducing temperature non-uniformity.

For example, as illustrated in FIG. 3A and FIG. 3B, the detection chip 100 further includes a second insulating layer 17, and the second insulating layer 17 is disposed between the heating electrode 12 and the micro-cavity definition layer 11. The second insulating layer 17 is used to protect the heating electrode 12, provide an insulating effect, prevent the liquid from eroding the heating electrode 12, slow down the aging of the heating electrode 12, and provide a planarization effect. For example, the second insulating layer 17 may be made of an inorganic insulating material or an organic insulating material. For example, the material of the second insulating layer 17 is silicon dioxide, silicon nitride, or the like. For example, the material of the second insulating layer 17 may be the same as or different from the material of the first insulating layer 16.

Figure 4:
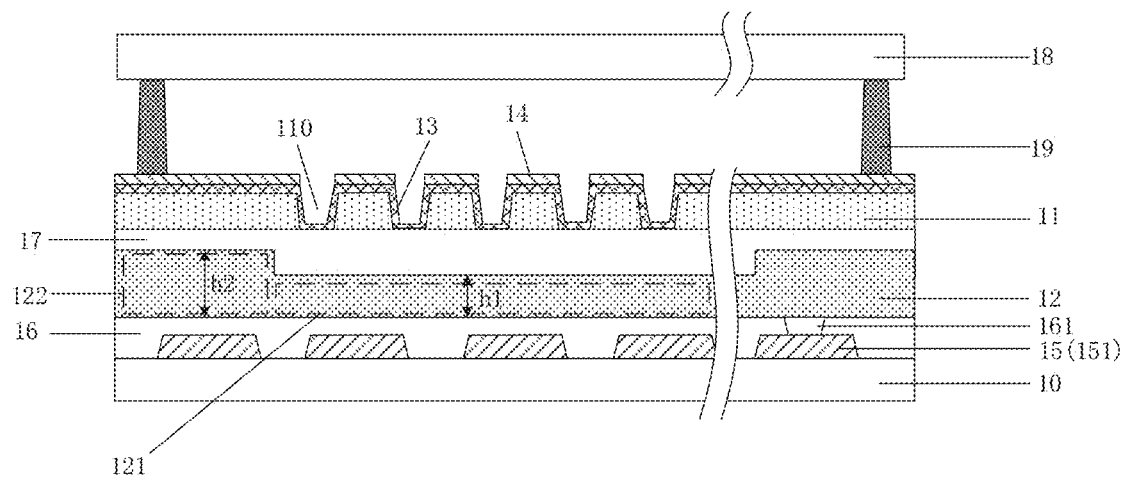
FIG. 4 is a schematic cross-sectional diagram of another detection chip provided by some embodiments of the present disclosure.

FIG. 4 is a schematic cross-sectional diagram of another detection chip provided by some embodiments of the present disclosure. For example, as illustrated in FIG. 4, the detection chip 100 provided by this embodiment is basically the same as the detection chip 100 illustrated in FIG. 2, FIG. 3A, and FIG. 3B, except that a second substrate 18 and a spacer 19 are further included.

In this embodiment, the second substrate 18 is disposed opposite to the first substrate 10, and provides functions such as protection, support, isolation, etc. There is a gap between the second substrate 18 and the first substrate 10 to form a space for containing liquid. For example, the second substrate 18 may be a glass substrate.

Because both the first substrate 10 and the second substrate 18 can be glass substrates, and the micro-cavity definition layer 11 can be prepared by using photoresist, the detection chip 100 can be prepared by micro-processing with a combination of the glass base and the semiconductor process, which may be compatible with the semiconductor production line, simple in preparation, and low in production cost, and may facilitate implementing large-scale standardized production. For example, the detection chip 100 can be compatible with the G2.5 production line, such as the CF line in the G2.5 production line.

It should be noted that, in the embodiments of the present disclosure, the first substrate 10 and the second substrate 18 may also adopt other suitable substrates, which are not limited in the embodiments of the present disclosure. For example, the shapes of the first substrate 10 and the second substrate 18 may be rectangular, or may be other suitable shapes, which are not limited in the embodiments of the present disclosure.

For example, the spacer 19 is provided at the edge of the detection chip 100 and between the first substrate 10 and the second substrate 18. The spacer 19 is configured to maintain the distance between the first substrate 10 and the second substrate 18, thereby providing space for the flow of the reaction system solution. For example, in some embodiments, some spacers 19 may also be disposed in the center region (e.g., the reaction region 21) of the detection chip 100, for example, distributed at a plurality of positions in the reaction region 21, thereby improving the compressive strength of the detection chip 100 and preventing the detection chip 100 from being damaged by the external force applied to the reaction region 21. For example, there may be a plurality of spacers 19, and the sizes and shapes of the plurality of spacers 19 may be the same as each other, thereby improving the thickness uniformity of the detection chip 100. For another example, the sizes and shapes of the plurality of spacers 19 may also be set according to the possible stress condition of the detection chip 100. For example, in the periphery and center of the detection chip 100, the size of the spacer 19 is relatively large, while the size of the spacer 19 at other positions is relatively small.

For example, the material of the spacer 19 may be an organic material which can be solidified, for example, a thermosetting material or a photocuring material such as an ultraviolet (UV) hardening type acrylic resin or other suitable materials. The shape of the spacer 19 may be a spherical shape. In this case, the spacer 19 may be put into the frame sealant and mixed uniformly, and then the first substrate 10 and the second substrate 18 are encapsulated by the frame sealant to allow the first substrate 10 and the second substrate 18 to form a cell. In this way, the spacer 19 mixed in the frame sealant can control the distance between the first substrate 10 and the second substrate 18. The embodiments of the present disclosure include but are not limited to this case, and the shape of the spacer 19 may also be any suitable shape such as a columnar shape, an ellipsoidal shape, or the like.

For example, as illustrated in FIG. 2, the detection chip 100 further includes at least one sample inlet 31 and at least one sample outlet 32, and both the sample inlet 31 and the sample outlet 32 penetrate the second substrate 18. For example, the sample inlet 31 is a channel for injecting the reaction system solution, and the sample outlet 32 is a channel for discharging the excess reaction system solution or separating the original sample liquid. For example, the reaction system solution may be injected into the sample inlet 31 through a micro-syringe pump or a pipette gun, and then enter each micro-reaction chamber 110 through self-aspirating liquid. The reaction system solution which does not enter the micro-reaction chamber 110 flows out of the detection chip 100 through the sample outlet 32. For example, the sample inlet 31 and the sample outlet 32 are symmetrically distributed with respect to the central axis of the detection chip 100, so that the flow of the reaction system solution in the detection chip 100 can be more uniform, and the reaction system solution can easily enter the micro-reaction chambers 110.

For example, the second substrate 18, the micro-cavity definition layer 11, and the frame sealant including the spacer 19 cooperate to define the sample inlet channel and the sample outlet channel of the droplets of the reaction system solution, thereby ensuring that the droplets can move to each micro-reaction chamber 110, and the droplets which do not enter the micro-reaction chamber 110 flow out of the space between the first substrate 10 and the second substrate 18 through the sample outlet 32.

It should be noted that, in the embodiments of the present disclosure, the detection chip 100 may further include more components, which are not limited to the components described above and may be determined according to actual needs, and the embodiments of the present disclosure do not limit this. For example, the detection chip 100 may further include a temperature sensor for detecting the temperature of the reaction region 21.

Figure 5A:
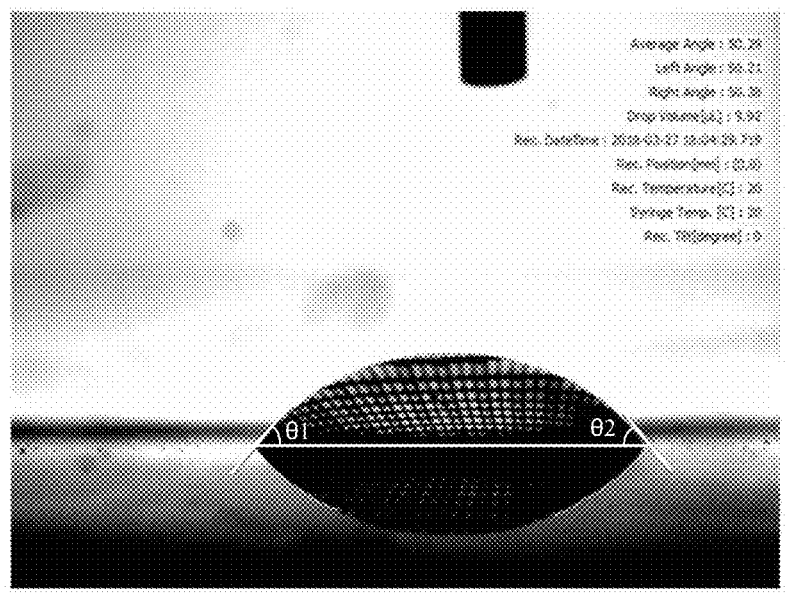
FIG. 5A is a schematic diagram of a surface hydrophilicity and hydrophobicity test performed on a micro-reaction chamber before surface modification.
Figure 5B:
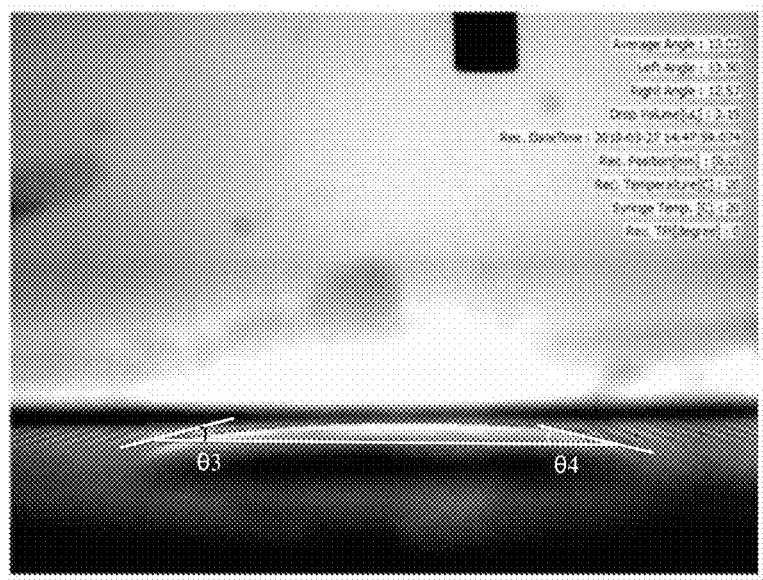
FIG. 5B is a schematic diagram of a surface hydrophilicity and hydrophobicity test performed on a micro-reaction chamber after surface modification.

FIG. 5A is a schematic diagram of a surface hydrophilicity and hydrophobicity test performed on a micro-reaction chamber before surface modification, and FIG. 5B is a schematic diagram of a surface hydrophilicity and hydrophobicity test performed on a micro-reaction chamber after surface modification. Here, the "micro-reaction chamber before surface modification" means a micro-reaction chamber without the hydrophilic layer provided on the bottom and the sidewall of the micro-reaction chamber, and is hereinafter referred to as a first micro-reaction chamber; and the "micro-reaction chamber after surface modification" means a micro-reaction chamber with the hydrophilic layer provided on the bottom and the sidewall of the micro-reaction chamber, that is, the micro-reaction chamber 110 in the detection chip 100 provided by the embodiments of the present disclosure, and is hereinafter referred to as a second micro-reaction chamber.

For example, in the test process illustrated in FIG. 5A and FIG. 5B, deionized water is used as the test droplet, and the contact angle of the droplet on the surface (the bottom or sidewall) of the micro-reaction chamber is tested. As illustrated in FIG. 5A, the volume of the first test droplet is 9.92 μL. For the first micro-reaction chamber, the left contact angle θ1 between the first test droplet and the surface of the first micro-reaction chamber is about 50.38°, and the right contact angle θ2 between the first test droplet and the surface of the first micro-reaction chamber is about 50.21°, so that the average contact angle between the first test droplet and the surface of the first micro-reaction chamber is about 50.29°. As illustrated in FIG. 5B, the volume of the second test droplet is 3.19 μL. For the second micro-reaction chamber, the left contact angle θ3 between the second test droplet and the surface of the second micro-reaction chamber is about 12.57°, and the right contact angle θ4 between the second test droplet and the surface of the second micro-reaction chamber is about 13.50°, so that the average contact angle between the second test droplet and the surface of the second micro-reaction chamber is about 13.03°. It can be seen that, in some embodiments of the present disclosure, because the surface of the micro-reaction chamber 110 is provided with the hydrophilic layer 13, the hydrophilicity is greatly improved, and the contact angle between the droplet and the surface of the micro-reaction chamber 110 is relatively small.

At least one embodiment of the present disclosure further provides a reaction system, and the reaction system includes a control device and the detection chip according to any one of the embodiments of the present disclosure. The reaction system has good effect of temperature control and high efficiency of temperature rising and lowering, which can improve the accuracy of the detection result, and is also simple to manufacture, compatible with the semiconductor production line, and low in production cost, which may facilitate achieving large-scale standardized production.

Figure 6:
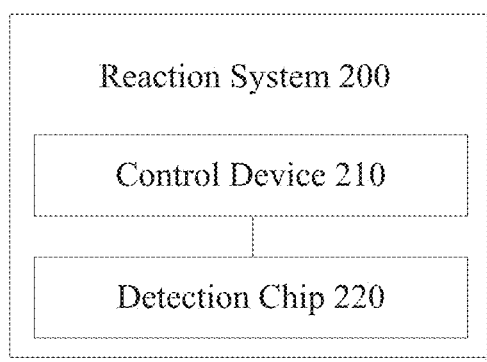
FIG. 6 is a schematic block diagram of a reaction system provided by some embodiments of the present disclosure.

FIG. 6 is a schematic block diagram of a reaction system provided by some embodiments of the present disclosure. For example, as illustrated in FIG. 6, the reaction system 200 includes a control device 210 and a detection chip 220. The control device 210 is electrically connected to the detection chip 220 and is configured to apply an electrical signal to the detection chip 220. For example, the detection chip 220 is the detection chip provided by any one of the embodiments of the present disclosure, such as the detection chip 100 described above. For example, the plurality of micro-reaction chambers of the detection chip 220 can contain the reaction system solution. The control device 210 applies the electrical signal to the connection electrode of the detection chip 220, and the electrical signal is transmitted to the control circuit of the detection chip 220 and is applied to the heating electrode of the detection chip 220 through the control circuit, so that the heating electrode can release heat, thereby controlling the temperature of the reaction region of the detection chip 220. The reaction system solution contained in the plurality of micro-reaction chambers of the detection chip 220 performs an amplification reaction at an appropriate temperature.

For example, the control device 210 may be implemented as general-purpose or special-purpose hardware, software, or firmware, and for example, may also include a central processing unit (CPU), an embedded processor, a programmable logic controller (PLC), etc., and the embodiments of the present disclosure are not limited in this aspect.

It should be noted that, in the embodiments of the present disclosure, the reaction system 200 may further include more components, for example, a temperature sensor, an optical unit, a cooling unit, a communication unit, a power supply, etc., and the embodiments of the present disclosure do not limit this. Detailed descriptions and technical effects of the reaction system 200 may be with reference to the above description of the detection chip 100, and details are not repeated herein again.

At least one embodiment of the present disclosure further provides a method for manufacturing a detection chip, and the method can be used to manufacture the detection chip described in any one of the embodiments of the present disclosure. The method is simple and compatible with the semiconductor production line, facilitates achieving large-scale standardized production, and has low production cost. The detection chip manufactured by using the method has good effect of temperature control and high efficiency of temperature rising and lowering, which can improve the accuracy of the detection result.

Figure 7:
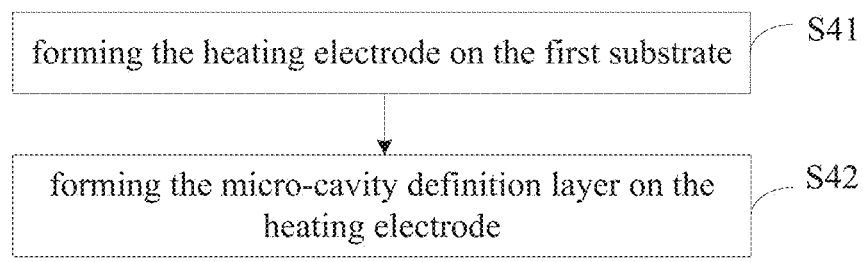
FIG. 7 is a schematic flowchart of a method for manufacturing a detection chip provided by some embodiments of the present disclosure.

FIG. 7 is a schematic flowchart of a method for manufacturing a detection chip provided by some embodiments of the present disclosure. For example, as illustrated in FIG. 7, the method includes following operations.

Step S41: forming the heating electrode 12 on the first substrate 10.

Step S42: forming the micro-cavity definition layer 11 on the heating electrode 12.

For example, in step S41, a sputtering process may be used to form the heating electrode 12, and the heating electrode 12 may adopt a transparent conductive material, such as ITO, tin oxide, or the like. For example, in step S42, the micro-cavity definition layer 11 may be formed by processes such as spin coating, exposure, development, etching, etc., and the micro-cavity definition layer 11 includes the plurality of micro-reaction chambers 110. For example, the material of the micro-cavity definition layer 11 is photoresist, for example, the thick-film processable photoresist.

Figure 8:
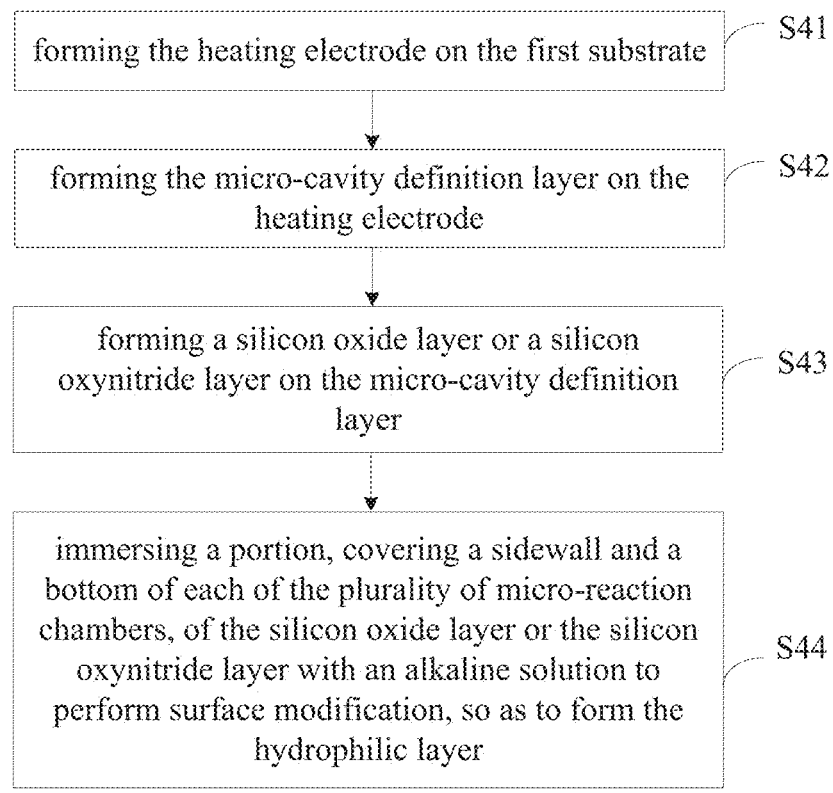
FIG. 8 is a schematic flowchart of another method for manufacturing a detection chip provided by some embodiments of the present disclosure.

FIG. 8 is a schematic flowchart of another method for manufacturing a detection chip provided by some embodiments of the present disclosure. For example, as illustrated in FIG. 8, steps S41 and S42 in the method provided by this embodiment are basically the same as steps S41 and S42 in the method illustrated in FIG. 7, the specific descriptions of steps S41 and S42 may be with reference to the above content, and details are not repeated herein again.

For example, in this embodiment, the method further includes following operations.

Step S43: forming a silicon oxide layer or a silicon oxynitride layer on the micro-cavity definition layer 11.

Step S44 immersing a portion, covering a sidewall 111 and a bottom 112 of each of the plurality of micro-reaction chambers 110, of the silicon oxide layer or the silicon oxynitride layer with an alkaline solution to perform surface modification, so as to form the hydrophilic layer 13.

For example, in step S43, the silicon oxide layer or the silicon oxynitride layer may be formed by processes such as evaporation, deposition, sputtering, or the like. For example, the material of the silicon oxide layer may be silicon dioxide.

For example, in step S44, the alkaline solution may be a potassium hydroxide solution. For example, the mass fraction of the potassium hydroxide solution is about 0.4%. The silicon oxide layer or the silicon oxynitride layer is immersed with the potassium hydroxide solution for about 15 minutes to achieve surface modification of the silicon oxide layer or the silicon oxynitride layer, and then operations such as cleaning and drying are performed, so as to obtain the hydrophilic layer 13. For example, the above modification treatment may be referred to as surface alkali treatment. The operation method of the surface alkali treatment is simple, the cost of the reagent is low and is easy to obtain, and no complicated external equipment is needed, which can improve the processing efficiency.

It should be noted that, in the embodiments of the present disclosure, the alkaline solution used for the surface alkali treatment is not limited to the potassium hydroxide solution, and other applicable alkaline solutions may also be used. The concentration (e.g., the mass fraction) of the alkaline solution is not limited, which can be determined according to actual needs. The immersion time of the alkaline solution is not limited to 15 minutes and may be extended or shortened according to the actual situations, which is not limited in the embodiments of the present disclosure.

The process of the detection chip 100 provided by some embodiments of the present disclosure is exemplarily described below. For example, the detection chip 100 is manufactured through processes, such as sputtering, plasma enhanced chemical vapor deposition (PECVD), reactive ion etching (RIE etch), photolithography, and the like, with the G2.5 production line.

First, the first substrate 10 (for example, a glass substrate) is cleaned. For example, the thickness of the first substrate 10 is 500 microns. Next, a metal material is deposited on the first substrate 10 at 240° C. to form the control circuit layer 15. For example, the material of the control circuit layer 15 is a laminated structure of molybdenum-neodymium aluminum alloy-molybdenum (Mo—AlNd—Mo), and the thickness of each single layer is 200 A, 3000 A, and 800 A, respectively.

Then, the first insulating layer 16 is deposited at 200° C., the material of the first insulating layer 16 is silicon dioxide, and the thickness of the first insulating layer 16 is 3000 A or 4000 A. Next, the via hole 161 is formed in the first insulating layer 16 by an etching process. For example, in this etching process, the process parameters can be respectively set to: 150 mt/800 w/400, $O_2$/10 s; 60 mt/800 w/200, $CF_4$/50, $O_2$/200 s; 130 mt/800 w/400, $O_2$/40 $CF_4$/30 s; 60 mt/800 w/200, $CF_4$/50 $O_2$/160 s.

Next, the heating electrode 12 is deposited. The material of the heating electrode 12 is ITO, and the thickness may be 560 A, 900 A or 1800 A. It should be noted that the heating electrode 12 includes the first electrode portion 121 and the second electrode portion 122, and the thickness of the first electrode portion 121 is smaller than the thickness of the second electrode portion 122.

Then, the second insulating layer 17 is deposited. The material of the second insulating layer 17 is silicon nitride, and the thickness is 3000 A or 4000 A. Alternatively, the second insulating layer 17 may have a laminated structure of silicon dioxide and silicon nitride, the thickness of silicon dioxide is 1000 A, and the thickness of silicon nitride is 2000 A.

Figure 9A:
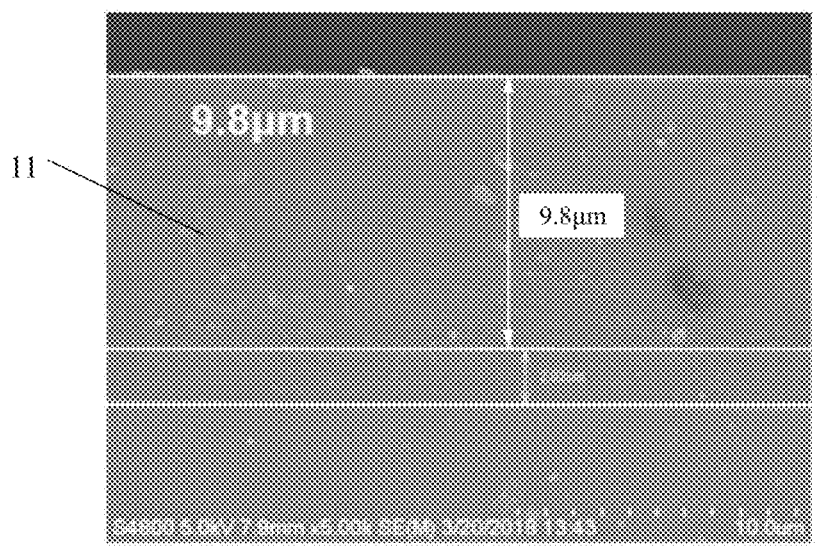
FIG. 9A is a schematic scanning electron microscope diagram of a micro-cavity definition layer of a detection chip provided by some embodiments of the present disclosure.
Figure 9B:
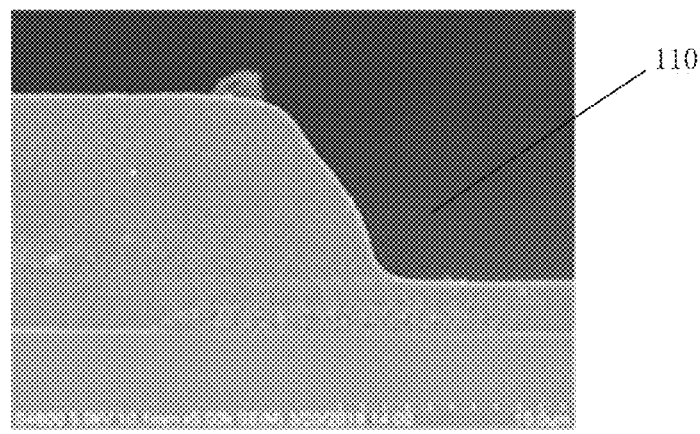
FIG. 9B is a schematic scanning electron microscope diagram of a micro-reaction chamber of a detection chip provided by some embodiments of the present disclosure.

Next, the micro-cavity definition layer 11 is formed. The PS resist is coated by a spin-coating process with a process parameter of 30 Kpa\300 rpm*10 s, and then pre-baked at 90° C. for 120 s. After repeating the steps of spin coating and pre-baking twice, exposure is performed and then development is performed for 100 s, and then post-baking is performed at 230° C. for 30 minutes. Thus, the micro-cavity definition layer 11 having the plurality of micro-reaction chambers 110 can be formed. As illustrated in FIG. 9A, the thickness of the micro-cavity definition layer 11 is about 9.8 microns. As illustrated in FIG. 9B, the micro-reaction chamber 110 is formed into a micro-depression structure.

Then, the hydrophilic layer 13 is formed. A silicon dioxide layer is deposited at 200° C., and the thickness is 3000 A. The PR resist is coated and exposed in position, and the micro-reaction chamber 110 is developed and exposed. The exposed micro-reaction chamber 110 is immersed in a potassium hydroxide solution with a mass fraction of about 0.4%, and the immersion time is about 15 minutes, thereby allowing the silicon dioxide covering the sidewall 111 and the bottom 112 of the micro-reaction chamber 110 to be modified so as to obtain the hydrophilic layer 13.

Next, the hydrophobic layer 14 is formed. Silicon nitride is spin-coated with a process parameter of 300 rpm*10 s, pre-baked at 90° C. for 120 s, and post-baked at 230° C. for 30 minutes. A plasma modification method is used to perform surface modification treatment to modify the silicon nitride, thereby forming the hydrophobic layer 14.

Finally, a laser low-temperature bonding process is used to bond the second substrate 18 and the first substrate 10 so as to allow the second substrate 18 and the first substrate 10 to form a cell and further form a structure with a cavity, so that the detection chip 100 can be obtained.

It should be noted that in the embodiments of the present disclosure, the above method may further include more steps and operations, and the execution sequence of respective steps is not limited, which may be determined according to actual needs. Detailed descriptions and technical effects of the method may be with reference to the above description of the detection chip 100, and details are not repeated herein again.

At least one embodiment of the present disclosure further provides a method for operating a detection chip, and the method can be used to operate the detection chip described in any one of the embodiments of the present disclosure. This method can improve the effect of temperature control and improve the efficiency of temperature rising and lowering, thereby improving the accuracy of the detection result.

Figure 10:
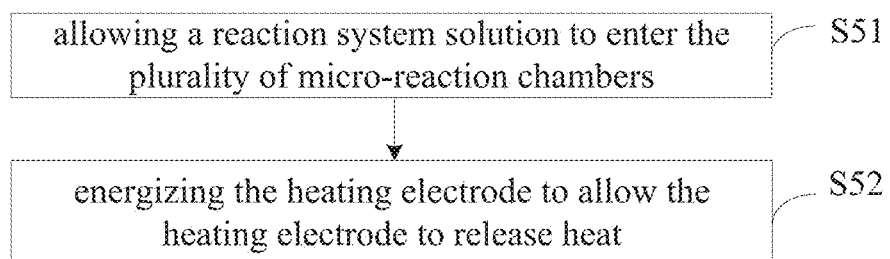
FIG. 10 is a schematic flowchart of a method for operating a detection chip provided by some embodiments of the present disclosure.

FIG. 10 is a schematic flowchart of a method for operating a detection chip provided by some embodiments of the present disclosure. For example, as illustrated in FIG. 10, the method includes following operations.

Step S51: allowing a reaction system solution to enter the plurality of micro-reaction chambers 110.

Step S52: energizing the heating electrode 21 to allow the heating electrode 21 to release heat.

For example, in step S51, the reaction system solution may be injected into the sample inlet 31 of the detection chip 100 through a micro-syringe pump or a pipette gun, and then enters each micro-reaction chamber 110 through self-aspirating liquid. For example, in step S52, the heating electrode 12 is energized and releases heat. Because the resistance value of the first electrode portion 121 is greater than the resistance value of the second electrode portion 122, the divided voltage of the first electrode portion 121 is greater, and the efficiency of temperature rising and lowering is higher.

It should be noted that, in the embodiments of the present disclosure, the above method may further include more steps and operations, and the execution sequence of respective steps is not limited, which may be determined according to actual needs. Detailed descriptions and technical effects of the method may be with reference to the above description of the detection chip 100, and details are not repeated herein again.

The following statements should be noted.
(1) The accompanying drawings involve only the structure(s) in connection with the embodiment(s) of the present disclosure, and other structure(s) can be referred to common design(s).
(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A reaction chip, comprising:
a first substrate;
a micro-cavity definition layer on the first substrate and defining a plurality of micro-reaction chambers; and
a heating electrode on the first substrate and closer to the first substrate than the micro-cavity definition layer, configured to release heat after being energized,
wherein the heating electrode comprises a first electrode portion and at least one second electrode portion electrically connected to the first electrode portion, the at least one second electrode portion is located at a periphery of the first electrode portion, and a resistance value of the first electrode portion is greater than a resistance value of the second electrode portion,
wherein the heating electrode is located between the first substrate and the micro-cavity definition layer, and is a planar electrode made of a transparent, electrically conductive material,
wherein in a plan view, the first electrode portion completely covers the plurality of micro-reaction chambers while the second electrode portion does not cover any of the plurality of micro-reaction chambers, and
the reaction chip comprises a reaction region and a cooling region, the plurality of micro-reaction chambers are located in the reaction region, the first electrode portion corresponds to the reaction region, and the second electrode portion corresponds to the cooling region.

2. The reaction chip according to claim 1, wherein a thickness of the first electrode portion in a direction perpendicular to the first substrate is smaller than a thickness of the second electrode portion in the direction perpendicular to the first substrate.

3. The reaction chip according to claim 1, further comprising a hydrophilic layer,
wherein the hydrophilic layer covers a sidewall and a bottom of each of the plurality of micro-reaction chambers.

4. The reaction chip according to claim 3, wherein a material of the hydrophilic layer is silicon oxide having been subjected to a first surface alkali treatment or silicon oxynitride having been subjected to a second surface alkali treatment.

5. The reaction chip according to claim 1, further comprising a hydrophobic layer,
wherein the hydrophobic layer covers a spacing region between the plurality of micro-reaction chambers in the micro-cavity definition layer.

6. The reaction chip according to claim 5, wherein a material of the hydrophobic layer is silicon nitride having been subjected to a plasma modification treatment.

7. The reaction chip according to claim 1, further comprising a control circuit layer and a first insulating layer which are sequentially stacked, at a side of the heating electrode close to the first substrate,
wherein the control circuit layer comprises a control circuit, the first insulating layer comprises a via hole, the control circuit is electrically connected to the heating electrode through the via hole, and the control circuit is configured to apply an electrical signal to the heating electrode to energize the heating electrode.

8. The reaction chip according to claim 7, wherein the control circuit layer further comprises a connection electrode, and the connection electrode is not covered by the first insulating layer and is exposed to atmosphere.

9. The reaction chip according to claim 8, wherein the reaction chip further comprises a peripheral region, the connection electrode corresponds to the peripheral region.

10. The reaction chip according to claim 7, further comprising a second insulating layer,
wherein the second insulating layer is between the heating electrode and the micro-cavity definition layer.

11. The reaction chip according to claim 1, further comprising a second substrate,
wherein the second substrate is disposed in opposite to the first substrate, and a gap is between the second substrate and the first substrate so as to form a space for containing a reaction solution.

12. The reaction chip according to claim 11, wherein the first substrate and the second substrate comprise glass substrates.

13. The reaction chip according to claim 1, wherein a material of the micro-cavity definition layer is a photoresist.

14. A reaction system, comprising a control device and a reaction chip,
wherein the reaction chip comprises:
a first substrate;
a micro-cavity definition layer on the first substrate and defining a plurality of micro-reaction chambers; and
a heating electrode on the first substrate and closer to the first substrate than the micro-cavity definition layer, configured to release heat after being energized,
wherein the heating electrode comprises a first electrode portion and at least one second electrode portion electrically connected to the first electrode portion, the at least one second electrode portion is located at a periphery of the first electrode portion, and a resistance value of the first electrode portion is greater than a resistance value of the second electrode portion, and the control device is electrically connected to the reaction chip, and is configured to apply an electrical signal to the reaction chip, wherein the heating electrode is located between the first substrate and the micro-cavity definition layer, and is a planar electrode made of a transparent, electrically conductive material, wherein in a plan view, the first electrode portion completely covers the plurality of micro-reaction chambers while the second electrode portion does not cover any of the plurality of micro-reaction chambers, and the reaction chip comprises a reaction region and a cooling region, the plurality of micro-reaction chambers are located in the reaction region, the first electrode portion corresponds to the reaction region, and the second electrode portion corresponds to the cooling region.

15. A method for manufacturing the reaction chip according to claim 1, comprising:

forming the heating electrode on the first substrate; and forming the micro-cavity definition layer on the heating electrode.

16. The method according to claim 15, wherein, in a case where the reaction chip further comprises a hydrophilic layer, the method further comprises:

forming a silicon oxide layer or a silicon oxynitride layer on the micro-cavity definition layer; and immersing a portion, covering a sidewall and a bottom of each of the plurality of micro-reaction chambers, of the silicon oxide layer or the silicon oxynitride layer with an alkaline solution to perform surface modification, so as to form the hydrophilic layer.

17. The method according to claim 16, wherein the alkaline solution is a potassium hydroxide solution.

18. The method according to claim 17, wherein a mass fraction of the potassium hydroxide solution is 0.4%.

19. A method for operating the reaction chip according to claim 1, comprising:

allowing a reaction system solution to enter the plurality of micro-reaction chambers; and energizing the heating electrode to allow the heating electrode to release heat.

* * * * *